United States Patent [19]

Price et al.

[11] Patent Number: 5,777,836
[45] Date of Patent: Jul. 7, 1998

[54] LINE CURRENT PROTECTION CIRCUIT AND METHOD FOR USE WITH A PCMCIA-ARCHITECTURE MODEM CARD

[75] Inventors: Tim Urry Price, Salt Lake City; Daniel Paul Petersen, Taylorsville, both of Utah

[73] Assignee: U.S. Robotics Mobile Communications Corp., Salt Lake City, Utah

[21] Appl. No.: 820,902

[22] Filed: Mar. 19, 1997

Related U.S. Application Data

[63] Continuation-in-part of Ser. No. 655,080, Jun. 3, 1996, Pat. No. 5,696,660, which is a continuation of Ser. No. 221,940, Apr. 1, 1994, Pat. No. 5,532,898.

[51] Int. Cl.$^6$ .......................... H02H 3/26; H04M 11/00
[52] U.S. Cl. .......................... 361/94; 361/115; 361/119
[58] Field of Search .......................... 361/119, 102, 361/93, 58, 56, 115, 94

[56] References Cited

U.S. PATENT DOCUMENTS

| | | | |
|---|---|---|---|
| 3,903,375 | 9/1975 | Dewit | 179/18 HB |
| 4,317,964 | 3/1982 | Biggs et al. | 179/81 R |
| 4,603,234 | 7/1986 | Huet | 179/16 AA |
| 4,709,296 | 11/1987 | Hung | 361/102 |
| 4,723,267 | 2/1988 | Jones | 379/93 |
| 4,958,371 | 9/1990 | Damoci et al. | 379/377 |
| 5,042,065 | 8/1991 | Kim | 379/165 |
| 5,125,027 | 6/1992 | Blaszykowski et al. | 379/399 |
| 5,140,631 | 8/1992 | Stahl | 379/377 |
| 5,369,687 | 11/1994 | Farkas | 379/98 |
| 5,532,898 | 7/1996 | Price | 361/119 |

FOREIGN PATENT DOCUMENTS 4-67715  3/1992  Japan .......................... H02H 3/02

Primary Examiner—Jeffrey A. Gaffin
Assistant Examiner—Stephen Jackson
Attorney, Agent, or Firm—Workman, Nydegger & Seeley

[57] ABSTRACT

A novel line-current protection circuit and method that is useable with a PCMCIA modem card is disclosed. The protection circuit is adapted to detect when an excessive voltage is present across the tip and the ring leads of a telephone subscriber loop by sensing the amount of line-current being supplied to line interface circuitry disposed on the PCMCIA modem card. The protection circuit includes a current sensing circuit portion that is placed in series with the tip lead and which detects when the line current exceeds a predetermined maximum amount. In the event the line current exceeds the maximum, the current sensing circuit asserts an excessive line current signal. A control and delay circuit causes the relay circuit to open the electrical connection between the modem and the telephone line only when the line current exceeds a predetermined maximum amount for a minimum amount of time. The protection circuit also includes a backup fuse, which will trip if the primary components of the protection circuit fail.

22 Claims, 6 Drawing Sheets

LINE CURRENT PROTECTION CIRCUIT AND METHOD FOR USE WITH A PCMCIA-ARCHITECTURE MODEM CARD

RELATED APPLICATION INFORMATION

This application is a continuation-in-part of U.S. Pat. application Ser. No. 08/655,080 filed Jun. 3, 1996 now U.S. Pat. No. 5,696,660, which is a continuation of U.S. Pat. application Ser. No. 08/221,940 filed Apr. 1, 1994, now U.S. Pat. No. 5,532,898.

BACKGROUND

1. Field of the Invention

This invention relates to modem communication systems that are used by computer equipment to communicate data across public or private telephone lines. More particularly, the invention relates to a line-current protection circuit, for use in a PCMCIA modem card, which protects modem circuitry from being damaged by an excessively high line current that can be supplied via the telephone subscriber line.

2. Background Art

Increasingly, users of personal computers and related computer equipment rely on the ability to utilize public and private telephone lines to transmit and receive data. This capability dramatically increases the value of the computer, and the productivity of the computer user. As the number of remotely accessible public and private networks, databases, computer-based bulletin boards and related computer services continues to expand, the need for this communication capability will continue to grow.

As is well known, computer equipment, such as personal computers, communicate across telephone lines via a piece of equipment known as a "modem." The term modem is an acronym derived from the phrase "modulator-demodulator," which is descriptive of the basic function performed by the modem. A modem permits the personal computer, which is a digital device, to be interfaced with telephone lines by modulating the outgoing digital data so that it is compatible with telephone networks, which are designed to handle analog signals (e.g., speech traffic). Similarly, the modem reverses that process by demodulating incoming analog data from the telephone line so that it is in a digital form that is useable by the computer.

The manner in which telephone equipment is interfaced to a public or private telephone network—both physically and electrically—has been largely standardized. This standardization is due to the universal need for telephonic systems and equipment to be both compatible and interchangeable. One of the more thoroughly standardized components of the telephone are the physical media connectors through which a piece of telephone equipment is physically and electrically connected to the telephone subscriber line. The standard media connector used in the United States is the RJ-11, 6-pin miniature module and plug. As is well known, most telephone equipment is equipped with the RJ-11 module, into which is received the RJ-11 plug and associated twisted-pair telephone cable, which is then plugged into, for instance, a telephone wall jack, also a standard RJ-11 module. In this manner, the telephone, modem, or other related telephone equipment is physically and electrically interfaced with the telephone subscriber loop. Voice or transmission data is then transmitted in analog form through the RJ-11 physical/electrical media connector into the telephone line. The manner in which telephone equipment, such as a modem, must electrically interface with the public telephone system has also been standardized so as to provide a compatible interface. Generally, modem manufacturers must provide an electrical line interface that moderates all signals or energy being input by the modem into the telephone line. This standard interface is required by the Federal Communications Commission (FCC) and the various telephone companies. The line interface protects the telephone lines and central telephone systems from being damaged, and thereby insures the integrity and quality of transmissions over the telephone lines.

This line interface circuitry is referred to as the Data Access Arrangement (DAA) circuit. The DAA line interface circuit provides an impedance match between the telephone equipment and the telephone line, and it also isolates and protects the telephone equipment from transient signals and other electrical disturbances that may be present on the telephone line. The DAA line interface circuit also protects the telephone line from any disabling electrical influences that may be generated by the telephone equipment (such as a modem). For example, the public telephone system could be damaged if, instead of transmitting frequency signals, the modem were to inadvertently inject DC power into the telephone line. This situation is avoided because the modem must incorporate the FCC mandated DAA line interface circuit, thereby ensuring that such a damaging signal is not inadvertently transmitted onto the public telephone lines.

As already noted, modems are increasingly being used to interconnect computers via public telephone lines. Initially, modems were largely configured as external accessory units, housed in their own cases, and attached to a port-connector located on the personal computer via a cable (usually a RS-232 port and cable). The external modem is then electrically connected to the telephone line via a standard RJ-type connection scheme, as discussed above. Further, an external modem would be equipped with the standard DAA line interface circuitry, as also described above.

External modems are, and will continue to be, widely used. However, with the increased popularity of smaller portable computers (referred to variously as laptop, notebook, subnotebook or palm-top computers), external modems are less desirable because of their cumbersome size, their need for an additional cable and computer port and their consequent lack of portability. As such, the external modem is simply not conducive to the needs of a portable computer user. In response to this drawback, smaller modems have been developed that are formed as an integral component within the portable computer. This type of internal modem is located within the housing of the portable computer such that it may be directly interfaced with the telephone line via an RJ-11 physical/electrical media connector and associated cable. The internal modem is also necessarily equipped with the required DAA line interface circuitry.

Although such internal modems are more conducive to the portability requirements of a portable computer, they have several drawbacks. For instance, as an integral component, such an internal modem cannot be easily interchanged with other computers. Further, these types of internal modems also take up limited physical space within the portable computer, often at the expense of other computer components, such as an internal disk drive. Further, as computer housings have continued to be downsized—even to the extent of being hand-held—internal spatial restrictions have necessitated that modems be even further reduced in size, without giving up functionality.

Such requirements have resulted in the establishment of standards for the internal accessories of the computer. One set of standards applicable to memory cards has been developed by the Personal Computer Memory Card International Association (PCMCIA). This organization is comprised of hundreds of manufacturers of memory cards and related peripheral equipment. The PCMCIA has published specifications setting forth the spatial standard for all memory cards used in down-sized computers as being restricted to a rectangular space approximately 55 millimeters in width, 85 millimeters in length, and 5 millimeters in depth (commonly referred to as the PCMCIA Type II standard).

In keeping with the PCMCIA standards for memory cards, internal modem manufacturers have adopted the same spatial standards for use with their down-sized modem cards. By complying with the standards established by PCMCIA for memory cards, modem card manufacturers have assured themselves of compatibility and spatial conformity with computers utilizing and complying with the PCMCIA specifications.

The constraints imposed by the PCMCIA specification have resulted in the development of "credit card" sized modem cards. Thus, most of the components formerly housed in an external or integral modem are now contained within a credit-card sized, PCMCIA card. As with any PCMCIA component, a PCMCIA modem card is merely inserted into any computer equipped with a PCMCIA compliant socket. In this way, a PCMCIA modem is interchangeable with other computers, and requires only a minimal amount of physical space.

Although much reduced in size, a PCMCIA modem is interfaced with an external telephone subscriber line in the same manner as an external or internal modem. Thus, a PCMCIA modem can be connected to the telephone line via a standard, RJ-type connector interface and cable. Further, the PCMCIA modem card also includes the standard DAA line interface circuitry previously discussed.

Because the PCMCIA modem card is equipped with a standard RJ-type connector, portable computer users can connect to a telephone line and communicate from almost anywhere in the world. Although this is an important advantage of a PCMCIA modem equipped portable computer, the capability also raises an important problem.

Many offices, hotels, schools and similar buildings are wired such that the telephone equipment contained within the building is not connected directly to the public telephone system. Rather, buildings are increasingly equipped with "Private Branch Exchanges" (PBX). A PBX is an automatic switching system that is used to interconnect terminal equipment, such as telephone sets, within a building or campus of buildings. When communication is required outside of the building, the PBX will act as a gateway to the public telephone network.

Typically, telephone equipment is connected to a PBX installation with a standard RJ-type connector, as described above. However, although the physical connection between the PBX and the telephone equipment is the same, some PBX equipment utilizes the electrical wires, or leads, contained within the RJ-11 connection in a manner different from the public telephone network. For example, some PBX systems utilize the two center leads of an RJ-11 connector, commonly referred to as the "tip" and the "ring" leads, in a manner that is significantly different from a public telephone company. More specifically, these PBXs utilize the tip and ring leads to supply power to the telephone sets that are designed to be used with that particular PBX system. This power is usually supplied as a differential DC voltage—typically in the range of 12 to 90 volts—that is applied across the tip and ring leads. However, no resistance is supplied to limit the current supplied. In contrast, the public telephone company places approximately 48 volts across the tip and ring leads, but the current is limited by a resistance of 400 Ohms to 1750 Ohms placed in series with the 48 volt source (thereby resulting a line-current that is usually less than around 120 mA).

Thus, problems can arise when a piece of telephone equipment, such as a PCMCIA modem, is plugged into a RJ-type telephone jack connected to a PBX. If the PBX utilizes the tip and ring leads in the manner described above, the higher supply voltage of the PBX is applied across the DAA line interface circuitry. Since the resulting current drawn by the DAA circuitry is not limited, and thereby excessively high (i.e., greater than the maximum acceptable level of approximately 120 mA), the DAA circuitry can be destroyed, and the PCMCIA modem thereby rendered inoperative. This problem is exacerbated by the fact that a portable computer user is usually unaware as to whether a particular RJ-11 (or similar RJ-type connector) telephone jack is connected to such a PBX. Consequently, the user may inadvertently plug the PCMCIA modem into such a "standard looking" jack, and thereby render the modem inoperative.

Solutions to this particular problem have heretofore not been entirely satisfactory. One solution is to protect the DAA line interface circuitry with a fuse type device. If the PCMCIA modem is taken "off-hook" while connected to a PBX that supplies an excessively high current, the fuse or fusible resistor will open, and thereby protect the DAA line interface circuitry. However, the fuse must then be physically replaced before the modem is again operative. Although this approach may work in an external type modem, wherein the fuse is relatively easy to access and replace, it is not practical in a PCMCIA modem card, wherein the electrical components are miniaturized and disposed within a sealed enclosure. Typically, the PCMCIA card must be returned to the manufacturer to have the fuse replaced —a costly and time consuming process.

Further, as is well known, the reaction time of a fuse is relatively slow and often unpredictable. Since fuses are generally slow to react to an excessive current, the DAA line interface circuitry must utilize components that are rated higher (and are thus physically larger) so as to compensate for the additional wattage consumed before the fuse reacts. This is not practical in a PCMCIA card environment, wherein physical space is extremely limited.

Finally, as noted above, the portable computer user is often unaware that a particular telephone jack is connected to a PBX system that will cause damage to the PCMCIA modem's DAA circuitry. Thus, even if a PCMCIA modem card is equipped with a fuse, and the modem is inadvertently connected to such a PBX, the modem will no longer be operable because the fuse remains open. The user typically will not know why the PCMCIA modem card has failed and is no longer operative. Diagnosis of the problem is very difficult—again resulting in a costly and time consuming process.

Similar "fuse" like devices have the same drawbacks. For instance, circuit breaking or current limiting devices are also generally slow to react. Further, these types of devices are relatively large, and again cannot physically fit within the limited space of a PCMCIA card.

Therefore, there remains a need for a line-current protection circuit that will insure that the DAA line interface circuitry is not damaged when inadvertently subjected to an excessively high current, and yet is functional within a PCMCIA-architecture card environment.

OBJECTS AND BRIEF SUMMARY OF THE INVENTION

The present invention has been developed in response to the present state of the art, and in particular, in response to the problems and needs in the art not heretofore fully or completely solved by line current protection schemes used in connection with PCMCIA-architecture modem cards. However, it is not intended that the apparatus of the present invention will necessarily be limited solely to PCMCIA modem cards, since it may also find useful application with other devices requiring protection from exposure to excessive line-current conditions. Thus, it is an overall object of the present invention to provide a line-current protection circuit which provides for cost effective and reliable protection of circuitry from an excessive line current condition.

Another object of the present invention is to provide a line-current protection circuit which utilizes electrical components which physically can be used within the limited space of a PCMCIA-architecture card.

Yet another object of the present invention is to provide a line-current protection circuit that is capable of detecting and responding to an excessive line current condition fast enough so as to insure that standard DAA line interface components used within a PCMCIA modem card are not damaged.

Another object of the present invention is to provide a line-current protection circuit that is capable of detecting and not responding to a transient signal present on the telephone line.

Still another object of the present invention is to provide a line-current protection circuit which is automatically reset after the excessive line current condition is removed, so that there is no need to physically remove or otherwise replace circuit components.

A further object of the present invention is to provide a line current protection circuit which is capable of indicating the presence of an excessive line current condition such that the PCMCIA modem user is aware of the condition and the reason for the modem's inoperability.

Additional objects and advantages of the present invention will become more fully apparent from the following more detailed description taken in conjunction with the drawings and claims, or may be learned by the practice of the invention.

Briefly summarized, the foregoing and other objects are achieved with a novel line-current protection circuit. The protection circuit is particularly advantageous in that it can be used within a PCMCIA-architecture modem card. The protection circuit is oriented so as to be placed in series with the tip lead of a telephone subscriber loop once the PCMCIA modem is plugged into the telephone subscriber loop via a standard RJ-type, or similar, connection. When connected to the telephone line in this manner, a differential DC voltage is presented to the DAA line interface circuitry across the tip and the ring leads of the telephone line. If an excessive line current is presented to the DAA line interface circuitry, that fault condition will be detected by the protection circuit, which will then respond by automatically disconnecting the DAA circuitry from between the tip and ring leads. This automatic disconnection occurs rapidly, before any damage is caused to the DAA circuit electrical components. Further, the connection will not be permitted to be reestablished until such time as the excessive line current condition is removed.

The line-current protection circuit is comprised of a relay means, which is connected between the DAA interface circuitry and the tip lead of the telephone line, and which selectively provides for either an open or a closed connection between the DAA circuitry and the tip and ring leads of the telephone line. The protection circuit is further comprised of a detection means, which is capable of detecting the magnitude of the line current that is presented to the DAA line interface circuitry, and which then causes the relay means to either open or close, depending on the magnitude of the line current. Thus, if the line current exceeds a predetermined maximum, such as approximately 120 mA, the detection means will sense that condition and therefore cause the relay means to open the circuit connection between tip and ring leads. In this manner, excessive current does not reach the DAA line interface circuitry.

In a preferred embodiment of the protection circuit of the present invention, the detection means is comprised of a current sensing means which is for providing an Excessive Line Current signal when the magnitude of the line current presented to the DAA circuitry exceeds a predetermined magnitude. The detection means is further comprised of a controller means which, depending on the state of the Excessive Line Current signal, will cause the relay means to be opened or closed. In one embodiment, the detection means may include circuitry that prevents the protection circuit from inadvertently reacting to false error conditions, such as may occur in the presence of a transient voltage condition that may occur when connected to certain analog Private Branch Exchange Systems.

The protection circuit may further include a backup fuse means, also connected between the DAA interface circuitry and the tip lead of the telephone line, which is for opening the connection between the DAA interface circuitry and the tip and ring leads if the line current were to exceed a second predetermined maximum magnitude. This fuse means acts as a backup protection in the event that the components making up the relay means or detector means were to fail.

BRIEF DESCRIPTION OF THE DRAWINGS

In order to more fully understand the manner in which the above-recited and other advantages and objects of the invention are obtained, a more particular description of the invention will be rendered by reference to specific embodiments thereof which are illustrated in the appended drawings. Understanding that these drawings depict only typical embodiments of the invention and are therefore not to be considered limiting of its scope, the invention in its presently understood best mode for making and using the same will be described with additional specificity and detail through the use of the accompanying drawings in which.

DETAILED DESCRIPTION OF THE PRESENTLY PREFERRED EMBODIMENTS

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

Figure 1:
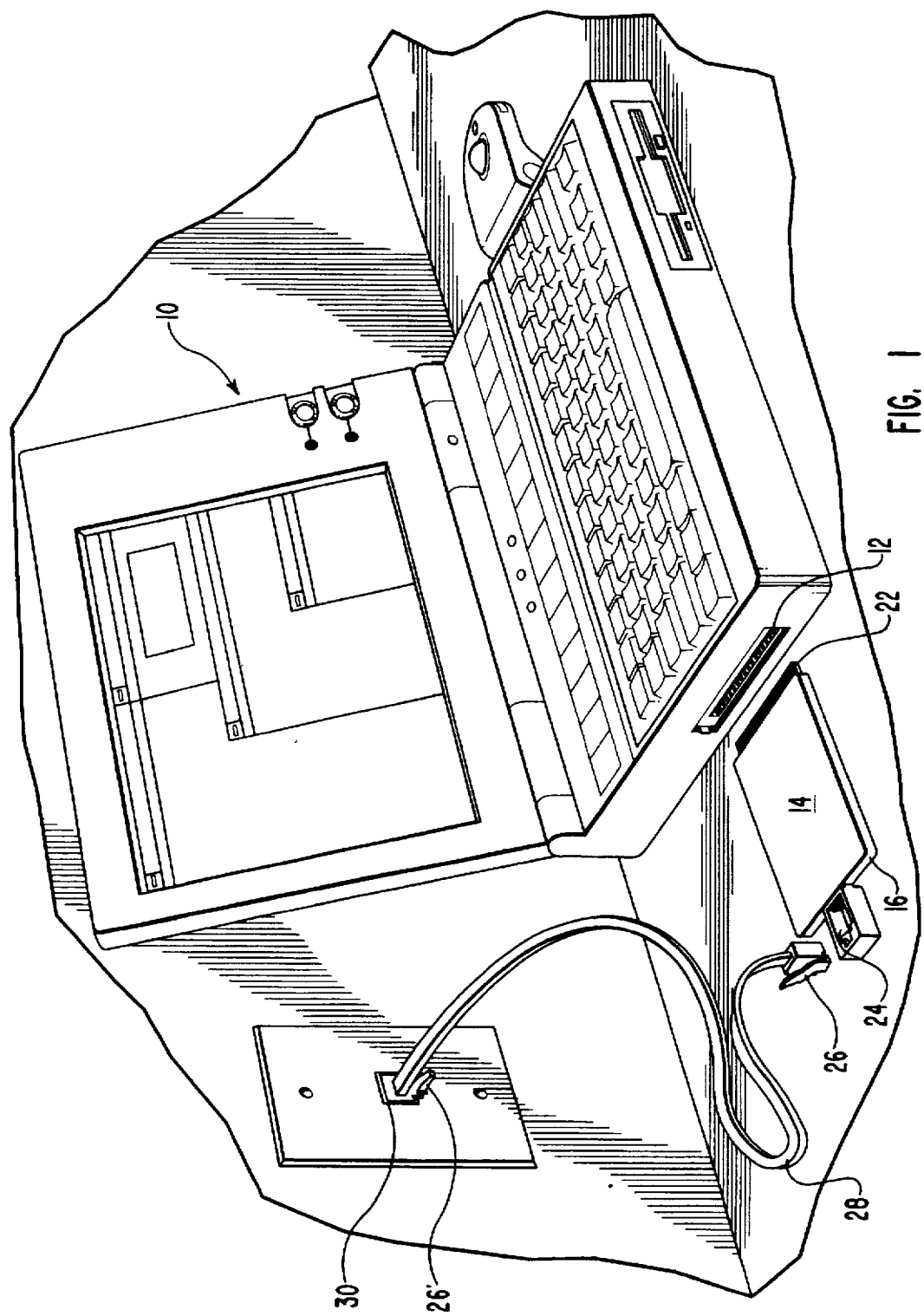
FIG. 1 is a perspective view of one environment in which the protection circuit of the present invention may be used.

Referring now to FIG. 1, illustrated is a typical environment in which the line-current protection circuit of the present invention can be used. A portable computer, designated generally at 10, is shown as having a PCMCIA socket 12. The PCMCIA socket 12 is designed so as to be capable of receiving any PCMCIA-architecture compliant card, as for instance the PCMCIA modem card illustrated and designated generally at 14. As is shown, modem card 14 is a standard PCMCIA card, having a plastic type enclosure 16 in which is disposed a printed circuit board 18 (shown in FIG. 2) onto which is placed the modem's various electrical components 20 (also shown in FIG. 2). Formed along one edge of the PCMCIA modem card 14 is an edge connector 22, which is designed to be detachably received within a corresponding connector slot (not shown) disposed within the PCMCIA socket 12. In this way, the PCMCIA modem card 14 is electrically interfaced with the portable computer 10.

Formed on the opposite edge of the PCMCIA modem card 14 is a standard RJ-11 socket-connector 24, which is designed to detachably receive a standard RJ-11 plug 26 and telephone wire 28 assembly. The opposite end of the wire 28 is also equipped with a RJ-11 plug 26', which is then detachably received within a RJ-11 telephone-jack 30, i.e., as would commonly be found on the wall of a office, etc. The telephone-jack 30 is in turn electrically connected to the public telephone lines, either directly or via a Private Branch Exchange (not shown). In this way, the PCMCIA modem card 14 is electrically connected to a telephone subscriber loop.

Figure 2:
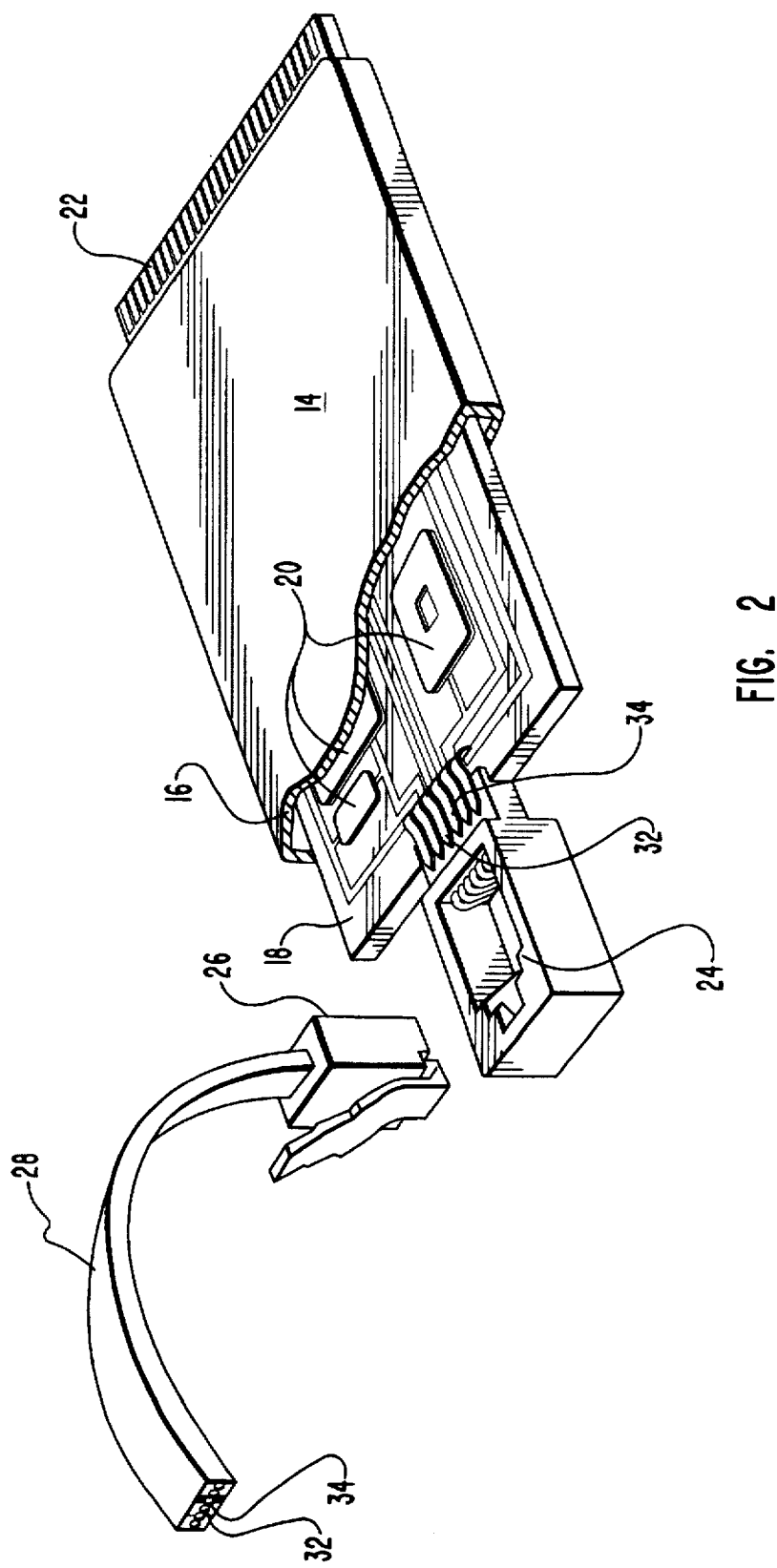
FIG. 2 is an exploded perspective view, illustrating a partial cross-sectional view of a PCMCIA modem card, the circuit components contained thereon, and the manner in which the card typically is connected to an external telephone subscriber loop, including the incoming tip and ring leads of an RJ-11 6-position connection.

Referring now to FIG. 2, illustrated is an enlarged perspective view of the PCMCIA modem card 14 of FIG. 1. As generally discussed, modem card 14 is equipped with a standard RJ-11 socket connector 24, designed to detachably receive a twisted-pair telephone wire 28 via a RJ-11 plug 26 assembly. It will be appreciated that this RJ-11 connection scheme, although described as an RJ-11 connector, could be any type of RJ-type connector. For instance, some PBX systems utilize an RJ-45 connector.

Typically, the telephone wire 28 will be comprised of six (6) separate wire leads. Although the number of wire leads may vary (for instance, there may be eight or four leads), there are generally a minimum of two center lead wires, referred to as a tip lead 32 and a ring lead 34. As is further shown, the tip 32 and ring 34 leads are electrically interfaced with the circuit components 20 contained on the printed circuit board 18 contained within the PCMCIA enclosure 16. As discussed above, a portion of the circuit components 20 comprise a portion of line interface circuitry, commonly referred to as a Data Access Arrangement circuit, which acts as an electrical interface between the telephone line and the rest of the modem circuitry.

Figure 3:
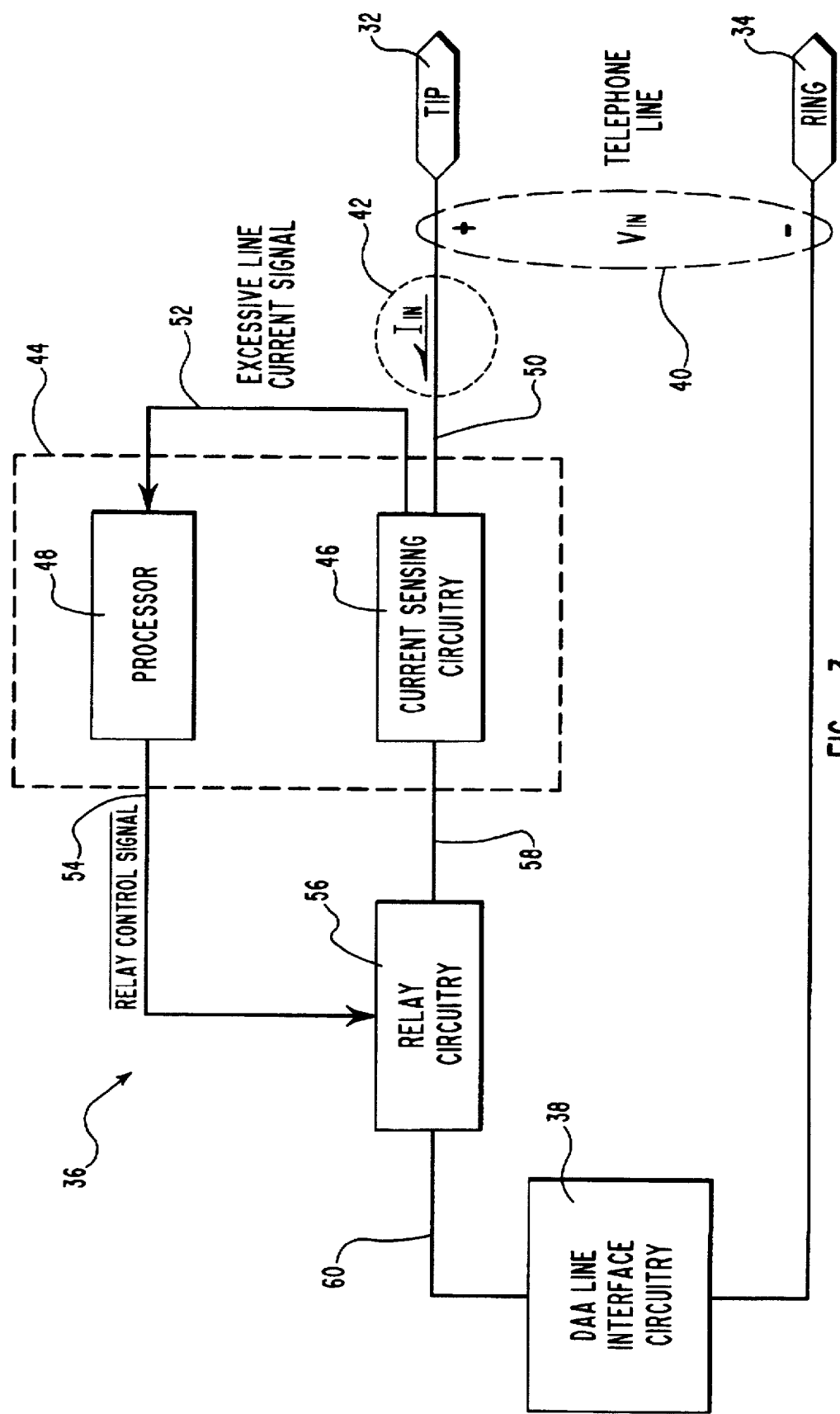
FIG. 3 is a functional block diagram which schematically illustrates the primary components of one presently preferred line-current protection circuit of the present invention.

Referring now to FIG. 3, a functional block diagram illustrating one presently preferred embodiment of the current invention is shown. The protection circuit, designated generally at 36, comprises, by way of example, relay means for selectively providing an open or a closed connection between the DAA Line Interface Circuitry 38 and the tip and the ring leads 32, 34; and a detection means, which detects the magnitude of any line current that is being supplied to the DAA line interface circuitry 38, and which is also for causing the relay means to open or close, depending on the magnitude of that line current. In one preferred embodiment, the detection means comprises, for example, a current sensing means for providing an "Excessive Line Current" signal when the magnitude of the line current presented to the DAA circuitry 38 via the tip lead 32 exceeds a predetermined magnitude, such as approximately 120 mA; and a controller means, which causes the relay means to be either opened or closed depending on the status of the Excessive Line Current signal.

With continued reference to FIG. 3, when the PCMCIA card 14 is detachably connected to a telephone subscriber loop, the tip 32 and the ring 34 leads are electrically connected across the DAA circuitry 38, and a DC voltage potential VIN, indicated at 40, will be present across the tip and ring leads 32, 34. The magnitude of that voltage will vary, depending on the nature of the telephone subscriber loop to which the modem card 14 is connected. For example, if the subscriber loop is connected directly to the public telephone system, the voltage will be approximately 48 volts, limited by a series resistance of approximately 400 Ohms to 1750 Ohms. In that case, the magnitude of the resulting current $I_{IN}$, shown as 42, is limited to a maximum of approximately 120 mA.

In contrast, if the modem card 14 is connected to the subscriber loop of a PBX system (not shown), the voltage $V_{IN}$ can be anywhere in the range of 12 to 90 volts—without any resistance to the resulting current $I_{IN}$. In that case, the magnitude of current $I_{IN}$ that is supplied to the DAA circuitry 38 can exceed the desired maximum magnitude of approximately 120 mA, and thereby destroy the DAA circuit components, rendering the modem card 14 inoperative.

As is shown in FIG. 3, in one presently preferred embodiment, detection means is comprised of, the functional components contained within the dotted box 44. In this particular embodiment, detection means is comprised of a current sensing means, as for example current sensing circuitry 46, and controller means, as for example programmable digital processor 48.

With continued reference to FIG. 3, the tip lead 32 of the incoming telephone line 28 is connected in series with the current sensing circuitry 46, as is schematically shown at line 50. The current sensing circuitry 46 is thereby positioned to detect the magnitude of line current $I_{IN}$ being supplied to the DAA circuitry 38. If the magnitude of that current exceeds a predetermined maximum, which in the preferred embodiment is approximately 120 mA, the current sensing circuitry 46 will generate an Excessive Line Current signal, as is schematically shown at line 52. The Excessive Line Current signal is then electrically connected, via line 52, to an input of the programmable digital processor 48.

Using programming techniques that are well known in the art, the digital processor 48 programmably monitors the status of the Excessive Line Current signal present on line 52. If the line current $I_{IN}$ 42 exceeds the maximum allowable level of 120 mA, the current sensing circuitry 46 will indicate the fault condition by asserting the Excessive Line Current signal input to the digital processor 48. The digital processor 48 is programmed to respond to the fault condition by asserting a Relay Control Signal, as is indicated at line 54.

FIG. 3 further illustrates how protection circuit 36 is comprised with a relay means, as for example relay circuitry 56. Relay circuitry 56 is also connected in series with the tip lead 32, as is schematically illustrated at line 58. Relay circuitry 56 can be operated so as to selectively open or close the circuit connection between the DAA circuitry 38 and the tip and the ring leads 32, 34. The relay circuitry 56 will be opened or closed depending on the status of the Relay Control Signal generated by the digital processor 48, as is shown at line 54. Thus, in this particular embodiment, if Relay Control Signal is asserted, thereby indicating an excessive line current fault condition (i.e., line current $I_{IN}$ 42 exceeds 120 mA), relay circuitry 56 will open, and prevent the line current $I_{IN}$ from damaging the DAA circuitry 38. This condition is otherwise referred to as an "On-Hook" state, wherein the PCMCIA modem card 14 is effectively disconnected from the telephone line. When the line-current is below the maximum allowable amount (i.e., the modem card 14 is plugged in to a telephone socket having a standard voltage present across the tip and the ring leads 32, 34), the Relay Control Signal will not be asserted by digital processor 48, and the relay circuit 56 will close, thereby completing the circuit connection between the DAA circuit 38 and the tip and ring leads 32, 34, as is schematically shown at line 60. This condition is otherwise known as an "Off-Hook" state, wherein the modem card 14 can send and receive data via the telephone line.

An important advantage of the protection circuit 36 is its capability to automatically and dynamically open or close the circuit connection depending on the magnitude of the line-current $I_{IN}$. Advantageously, when the fault condition is removed (i.e., the user plugs the modem card into a telephone-jack not having an excessive linecurrent $I_{IN}$), the modem will function correctly. There is no need to have components, such as burned fuses, replaced. Further, in the preferred embodiment, the digital processor 48 is the processor which is used to perform the PCMCIA modem's general command processing functions and the host (e.g., the portable computer utilizing the PCMCIA modem card) interface functions. Thus, when a fault-condition does occur, and the digital processor 48 causes the relay circuitry 56 to open, the digital processor 48 will also be programmed to cause a text string signal to be displayed on the screen of the host computer. This text screen will inform the user that an excessive line-current condition exists at the telephone-jack in which the PCMCIA-modem is connected. In this way, the user is alerted as to why the modem is not functioning.

Figure 4:
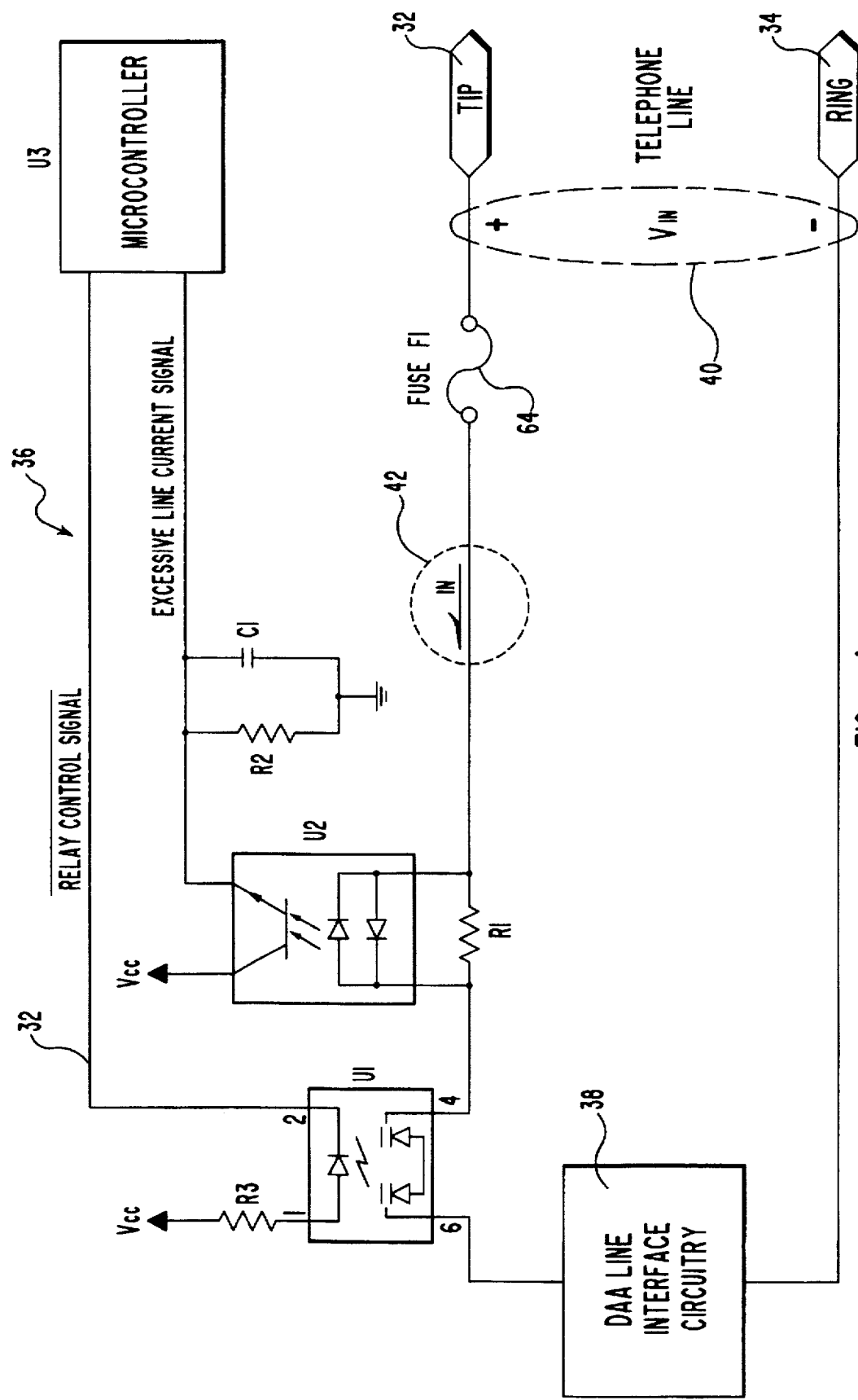
FIG. 4 is a detailed electrical schematic diagram which illustrates, as an example, the presently preferred embodiment and presently understood best mode for implementing the line-current protection circuit of the present invention.

Referring now to FIG. 4, an electrical schematic of one presently preferred embodiment of the protection circuit 36 is shown. The current sensing circuitry (46 in FIG. 3) is comprised of, for example, a sensing resistor R1 placed in series with the tip lead 32 so that line-current $I_{IN}$ passes therethrough. It will be appreciated that the sensing resistor R1 could alternatively be placed in series with the ring lead 34, and still have line-current $I_{IN}$ pass therethrough. Connected across the sensing resistor R1 is an optoelectronic device, such as photo-coupler U2. Thus, line-current $I_{IN}$ will generate a voltage across sensing resistor R1, the magnitude of which will vary in proportion with the magnitude of $I_{IN}$ in compliance with Ohm's law. As long as $I_{IN}$ is sufficiently low (i.e., below approximately 120 mA), the photo-responsive transistor portion of U2 will not conduct, and the Excessive Line Current signal output will stay grounded through pull-down resistor R2. Once the magnitude of line-current $I_{IN}$ exceeds an allowable maximum, as for example 120 mA, the resulting voltage across R1 will cause the corresponding photo-emitting diode of device U2 to turn on. The photo-responsive transistor portion of U2 will respond by conducting, and thereby asserting the Excessive Line Current Signal, by pulling it high.

False signals, such as transient spikes on the output of photo-coupler U2, are avoided by placing a capacitor C1 in parallel with the pull-down resistor R2. Alternatively, capacitor C1 could be placed in parallel with sensing resistor R1, on the photo-responsive transistor of U2. Also, C1 can be eliminated completely and any false signals can instead be detected by the digital processor/microcontroller U3. In this embodiment, the microcontroller U3 will be programmed to check for the presence of the Excessive Line Current Signal twice. If the signal is detected, the processor will wait for an amount of time, such as one millisecond, and then recheck the status of the signal. In this way, the microcontroller U3 can insure that the first occurrence of the signal was not merely a transient, false signal, as may be caused by line noise or other conditions, or that may result when the modem is connected to certain analog PBXes.

In yet another embodiment, electronics can be used to prevent the protection circuit from inadvertently reacting to false signals present on the telephone line. An example of such an embodiment is described below in connection with FIGS. 5 and 6.

The photo-coupler U2 shown in FIG. 4 is available as a single component, mounted in a small outline package, which can easily be mounted within the PCMCIA card 14 enclosure. Further, the device U2 provides the current sensing function, and yet has galvanic isolation from the telephone line, and thus has no need for an earth-ground voltage measurement reference and is largely impervious to large common-mode 60 Hz noise signals. One presently preferred photo-coupler U2 is the device made by NEC Corporation and identified by the part number PS2705-1.

As discussed, the Excessive Line Current Signal is supplied to an input of a digital processor (48 in FIG. 3). In the preferred embodiment, the digital processor 48 is comprised of a microcontroller U3, which is used to perform the PCMCIA modem's general command processing functions and the host (e.g., the portable computer utilizing the PCMCIA modem card) interface functions. A preferred microcontroller U3 is available as part of a chip-set manufactured and sold by Rockwell Corporation and known as the RC96ACL/RC144ACL integrated data/fax/voice modem device set family. This microcontroller U3 is more particularly known as a Rockwell C29 or C39 microcomputer. It will be appreciated that various other digital microprocessors, which are well known in the art, could also be used.

Microcontroller U3 is programmed, using techniques that are well known in the art, to continuously monitor the Excessive Line Current signal output by Opto-Coupler U2. When line-current $I_{IN}$ exceeds approximately 120 mA, the signal is asserted, and the microcontroller responds by asserting the Relay Control signal, which is electrically connected to relay circuitry (56 in FIG. 3).

The relay circuitry is comprised of, for example, a solid-state relay device, which in the preferred embodiment is a photo-MOS relay U1, sold by Aromat and known by the part number AQV214S. The Relay Control Signal is input to the relay device, as is schematically shown at line 32, so as to control the current flow through the LED portion of the photo-MOS relay U1. Thus, when a fault condition exists (i.e., excessive line current), microcontroller U3 asserts Relay Control Signal, thereby causing a non-conduct state through the relay device and resulting in an open circuit, or "On-Hook" state. In this state, line-current $I_{IN}$ does not reach the DAA line circuitry. In contrast, when Relay Control Signal is not asserted, the relay is in a closed position and the PCMCIA modem will be in an "Off-Hook" state, and function as intended.

Importantly, the protection circuit 36, using the above described components, is capable of detecting and responding to an excessively high line-current in the range of from 1 to 2 milliseconds. This insures that none of the DAA line interface circuit components are damaged by the high current.

FIG. 4 also illustrates the preferred embodiment as having a backup fuse means, such as fuse 64, which is connected in series with the tip lead 32 and the DAA line interface circuitry. Fuse 64 is for providing backup protection to the DAA line interface circuitry, and will open up the circuit connection in the event that the other circuit components fail, and the line-current INN exceeds a second predetermined maximum magnitude, such as 250 mA.

Figure 5:
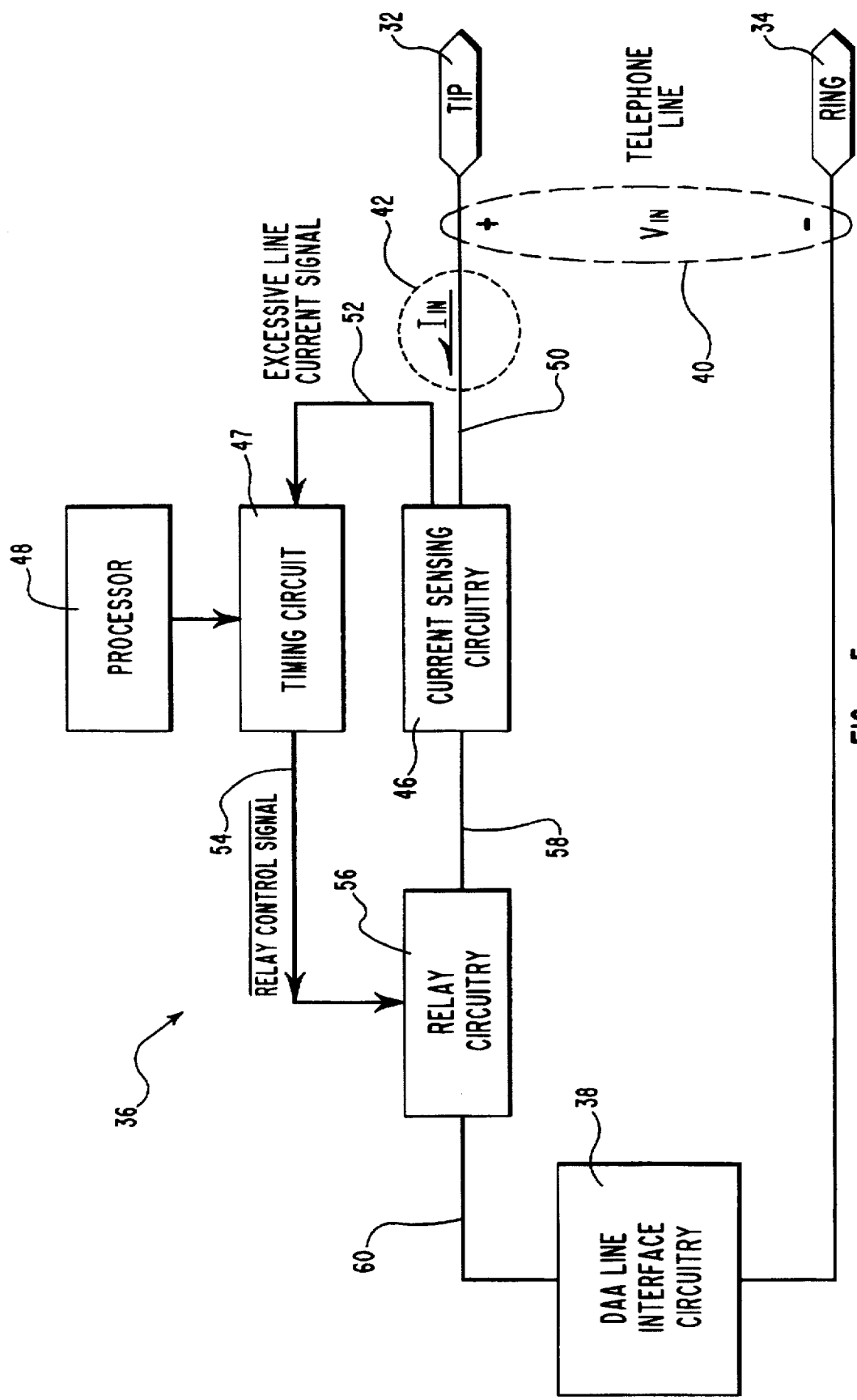
FIG. 5 is another functional block diagram illustrating the primary functional components of yet another preferred embodiment of the present invention.

Reference is next made to FIG. 5, which illustrates another embodiment of the invention. As was noted above, there are instances where the current sensing circuitry 46 (FIG. 4) may "detect" an excessive line current condition that is created by a false signal, such as a transient spike or electrical noise, on the telephone line. Such signals may result, for example, when the protection circuit is connected to certain analog PBXes. These signals are typically very short in duration and usually do not pose a threat to the DAA circuitry of the modem. As such, the protection circuit of the present invention should preferably be capable of detecting such a false condition, and should not respond to such a condition by opening the circuit connection between the telephone line and the modem interface circuitry.

As noted above, such protection can be implemented by way of software running on the microcontroller U3. In such an embodiment, the microcontroller U3 would be programmed to check for the presence of the Excessive Line Current Signal, wait for a predetermined amount of time, and then recheck for the presence of the excessive voltage condition. If the first detected Excessive Line Current condition had been caused by a transient condition, then that condition would not be present when rechecked after waiting the predetermined amount of time.

FIG. 5 illustrates a preferred embodiment wherein the false condition is checked not by way of software, but by way of an alternative circuit implementation. This particular embodiment includes a control and delay circuit means, which functions so that the relay means is only activated (i.e., opened) when the magnitude of the line-current exceeds the predetermined maximum magnitude for a predetermined minimum amount of time. This insures that the Excessive Line Current condition is not the result of a transient condition, which is of such a short duration that it would not affect the modem's DAA circuitry. The relay means will only be activated (i.e., opened) when the excessive line current condition is present for a predetermined minimum amount of time, which indicates that there is an excessive voltage being supplied via the telephone line that could damage the DAA circuit.

FIG. 5 illustrates, by way of example, one preferred embodiment of such an implementation by way of functional blocks. As is shown, the circuit preferably includes a current sensing circuit 46 which receives the incoming current $I_{IN}$, indicated at 42, and then functions to assert an Excessive Line Current Signal 52 when the magnitude of that current exceeds a predetermined magnitude. The asserted Excessive Line Current Signal is then supplied to the functional component designated at 47 and referred to as the Control and Delay circuit. This component provides the function referred to above as the Control and Delay circuit means, and insures that the relay circuit 56 will be opened only in the event that the incoming current 42 exceeds the predetermined maximum value for a specified minimum amount of time. If the incoming current exceeds the maximum for only a short period of time, as when there is a transient voltage condition, the control and delay circuit 47 will ensure that the relay circuitry is not opened by way of relay control signal 54.

Figure 6:
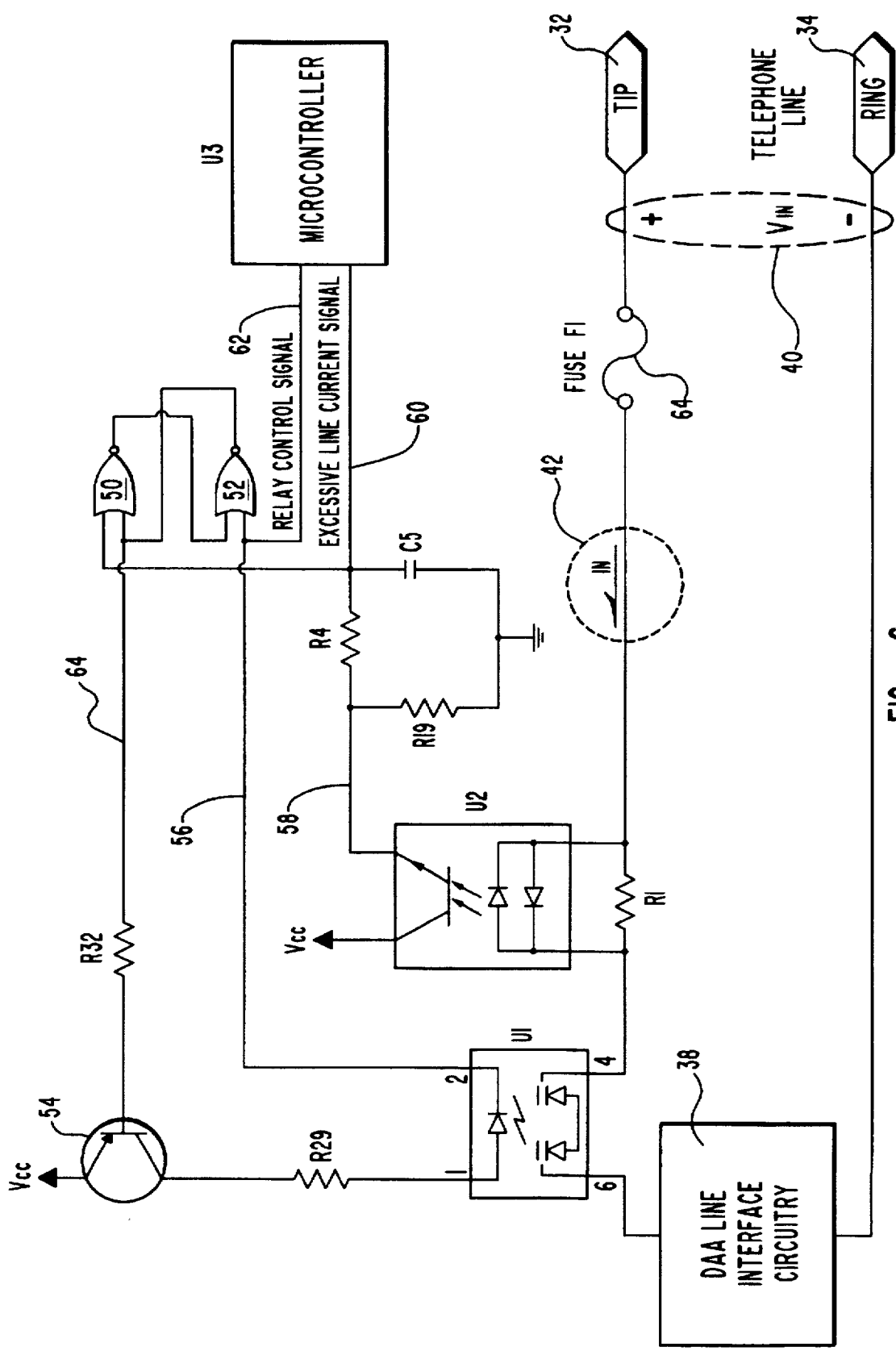
FIG. 6 is a detailed electrical schematic showing a presently understood best mode for implementing the embodiment of FIG. 5.

By way of example and not limitation, FIG. 6 illustrates one manner in which the control and delay circuit 47 can be implemented. As is shown, in this particular embodiment the current sensing circuitry 46 of FIG. 5 is comprised of a sensing resistor R1 that is oriented so that line-current $I_{IN}$ passes through it. A photo-coupler U2, preferably of the sort described previously in connection with FIG. 4, is then connected with respect to resistor R1 in a manner so that the output of the coupler U2 (i.e., the Excessive Line Current Signal) conducts when the magnitude of the line-current $I_{IN}$ exceeds a predetermined maximum.

The output of the photo-coupler U2 is connected, as is schematically shown at line 52, to the control and delay circuit, which is represented as functional box 47 in FIG. 5. In the preferred embodiment, the control and delay circuit 47 comprises, for example, a delay circuit means, electrically connected to the output of the photo-coupler U2, for asserting an activation signal only when the photo-coupler U2 conducts for a prescribed minimum amount of time (i.e., the Excessive Line Current Condition must be present for a predetermined minimum amount of time). Preferably, the circuit also includes a latch circuit means which generates a latched output in response to the asserted activation signal. The Control and Delay circuit also preferably includes a switch means for activating the relay means in response to the latched output.

By way of example and not limitation, the delay circuit means is comprised of an RC circuit as is shown in FIG. 6, which is comprised of resistors R4 and R19 and capacitor C5. In the preferred embodiment the resistor and capacitor values are selected and arranged so that the circuit provides a time constant so that the output of the photocoupler U2 (at line 52) is "delayed" for a sufficient amount of time, thereby insuring that there is a valid excessive line current condition. In one preferred embodiment, the values are selected so as to provide an RC time constant of approximately 6.8 mS. Thus, when the photo-coupler U2 begins conducting as a result of an excessive line current flowing through R1, the RC circuit (R19, R4 and C5) will begin to charge. As long as the photocoupler U2 continues to conduct, the RC circuit will continue to charge, and the voltage at the circuit's output (shown at schematic line 90) will continue to increase. This output voltage (at schematic line 90) is referred to as an "activation signal." In the preferred embodiment, the Activation signal is deemed to be "asserted" when it reaches approximately 2.5 volts, which, assuming a constant supply of current from photo-Page coupler U2, occurs after approximately 4.5 mS. Thus, due to the "delay" imposed by the RC network, the activation signal will not be asserted unless the photo-coupler U2 conducts for a predetermined minimum amount of time. As a result, if photo-coupler U2 detects an excessive voltage condition that is the result of a transient signal of short duration, it will stop conducting before the activation signal is asserted, and the circuit will not open the relay at U1', as is described below (i.e., a true error condition does not exist).

The time delay imposed by the RC circuit must be short enough so as to prevent damage to the modem if the line current is excessive, yet long enough so that the protection circuit does not open the relay circuit 56 in the event of a transient voltage condition. Also, it will be appreciated that while in the preferred embodiment the delay circuit is implemented with the RC circuit shown, other RC circuits, or other types of "delay" circuits could also be used. Also, in the particular circuit illustrated, if finer and further adjustment of the apparent resistance is needed, an additional resistor could optionally be connected in parallel with R4.

In the preferred embodiment, the output of the RC circuit, at schematic line 90, is connected to a latch circuit means. By way of example, the latch circuit means is comprised of a latch implemented with two interconnected NOR logic gates, shown at 70 and 72. This latch circuit asserts a latched output, shown at schematic line 82, in response to an asserted activation signal provided by the RC circuit. The latch circuit of FIG. 6 resets when the input (schematic line 78) to NOR gate 70 goes to a logic level one. This reset may be accomplished by way of microcontroller U3 control line 49. For instance, that particular control line may be the off-hook signal (active low), which returns to a high state after a time out period. Of course, any one of a number of different "latch" circuits could be used in lieu of the NOR gates, including transistors, other logic gates, flip-flops, operational amplifiers, or SCR's.

In the preferred embodiment, the latched output signal is then connected to the functional portion of the Control and Delay circuit 47 referred to as the switch means. By way of example and not limitation, FIG. 6 illustrates how in one preferred embodiment the switch means is comprised of a PNP transistor switch 76. Here, the latched output from the latch circuit is connected to the base of PNP transistor 76 by way of schematic line 74 and resistor R32. In this particular circuit arrangement, when the activation signal is asserted (i.e., indicating an excessive voltage condition), the latched output is asserted and transistor switch 76 is turned off. When turned off, transistor 76 stops feeding current to the relay circuit by way of schematic line 54 and resistor R29, which is shown as being implemented by way of a photo-MOS relay U1'. The photo-MOS relay U1' device of FIG. 6 opens the circuit connection between the telephone line and the DAA line interface circuit 38 when current is not supplied via transistor 76, i.e. the device goes into an on-hook state. Conversely, when the activation signal is not asserted (i.e., no excessive voltage condition is present), the latched output is not asserted, and transistor 76 is turned on and feeds current to photo-MOS relay U1'. Under this condition, U1' is closed, allowing the telephone line to be electrically connected to the DAA circuit 38, i.e., the device is in an off-hook state.

Table A provides values for the various circuit components in the circuit of FIG. 4, and FIG. 5. It should be appreciated that the particular circuit components and circuit design illustrated in FIGS. 4 and 5 are intended merely as an example of the presently preferred embodiment and the presently understood best mode of implementing the overall functions which are represented by the block diagram of FIGS. 3 and 4. Of course other circuit components can be devised that would also work satisfactorily.

TABLE A

| Component | Value |
|---|---|
| COMPONENT VALUES FOR LINE CURRENT PROTECTION CIRCUIT (FIG. 4) | |
| $R_1$ | 10 Ω |
| $R_2$ | 390 Ω |
| $R_3$ | 100 Ω |
| $C_1$ | .01 µf |
| $F_1$ | .25 A |
| COMPONENT VALUES FOR LINE CURRENT PROTECTION CIRCUIT (FIG. 6) | |
| $R_1$ | 7.5 Ω |
| $R_4$ | 100 kΩ |
| $R_{19}$ | 100 kΩ |
| $C_5$ | .068 µf |
| $R_{32}$ | 4.75 k |
| $R_{29}$ | 470 Ω |

In sum, the line-current protection circuit as described above addresses the previously unsolved problems in the prior art. The line-protection circuit insures that the DAA line interface circuitry of a modem is not damaged when the modem is inadvertently connected to a telephone line having an excessive line-current. Further, the circuit provides this protection while at the same time utilizing circuit components that physically can be used within a PCMCIA-architectured environment. Also, the protection circuit automatically resets when the fault condition is removed, and thus electrical components do not have to be replaced, nor is any servicing required on the modem card. When the fault condition does exist, the protection circuit is capable of causing a message to be displayed on the host computer, thereby notifying the user of the error condition. Finally, the protection circuit is able to distinguish between short duration, transient signals, and valid excessive line-current conditions.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States patent is:

1. A protection circuit intended for use with a line interface circuit that is electrically connectable to a telephone line, the protection circuit comprising:

relay means for selectively providing an open or a closed connection between the line interface circuit and the telephone line;

current sensing means for providing an excessive line current signal when the magnitude of a supply voltage present across the telephone line exceeds a predetermined magnitude, wherein the supply voltage presents a line-current to the interface circuit; and control and delay circuit means for activating the relay means when the magnitude of the supply voltage exceeds the predetermined magnitude for a predetermined amount of time.

2. A protection circuit as recited in claim 1, wherein the relay means comprises a solid-state relay device that is selectively operable to be either in a closed or an opened arrangement.

3. A protection circuit as recited in claim 1, wherein the current sensing means comprises an optoelectronic device connected so as to generate the excessive line current signal when the supply voltage exceeds the predetermined magnitude.

4. A protection circuit as recited in claim 1, wherein the control and delay circuit means comprises:

delay means for asserting an activation signal after a predetermined delay from the generation of the excessive line current signal;

latch means for asserting a latched output signal in response to said activation signal; and switch means for activating the relay means in response to the latched output.

5. A protection circuit as recited in claim 1, wherein the delay means comprises an RC circuit having a predetermined time constant so that the activation signal is asserted at an output of the RC circuit within a predetermined time of the assertion of the excessive line current signal.

6. A protection circuit as recited in claim 1, wherein the latch means comprises a resettable latch circuit that is capable of asserting a latched output signal upon receipt of the asserted activation signal.

7. A protection circuit as recited in claim 1, wherein the switch means comprises a transistor switch having an output that activates the relay means so as to open the connection between the line interface circuit and the telephone line when the latched output signal is asserted.

8. A protection circuit as recited in claim 4, further comprising a digital processor electrically connected to the latch means, whereby the digital processor is capable of programmably causing the latch means to reset the latched output signal after a predetermined time delay.

9. A protection circuit as recited in claim 1, further comprising a backup fuse means, connected between the line interface circuit and the telephone line, for opening the connection between the line interface circuit and the telephone line when the supply voltage exceeds a second predetermined maximum magnitude.

10. A protection circuit intended for use with a line interface circuit that is electrically connectable to a telephone line, the protection circuit comprising:

an electronic relay circuit capable of placing the line interface circuit into an on-hook or in an off-hook condition;

a sensing circuit that generates an excessive line current signal when the magnitude of a supply voltage present across the telephone line exceeds a predetermined magnitude, wherein the supply voltage results in a line-current presented to the interface circuit; and a control and delay circuit that causes the electronic relay to provide the onhook condition when the current sensing circuit generates the excessive line current signal for a predetermined amount of time.

11. A protection circuit as recited in claim 10, wherein the electronic relay circuit comprises a solid-state relay device that is selectively operable to be either in a closed or an opened arrangement, wherein the closed arrangement corresponds to the off-hook condition and the open arrangement corresponds to the on-hook condition.

12. A protection circuit as recited in claim 11, wherein the sensing circuit comprises:

a sensing resistor connected between the telephone line and the line interface circuit such that the line-current flows therethrough; and a optoelectronic device connected such that the optoelectronic device responds to a voltage across the sensing resistor by generating the excessive line current signal when the line-current exceeds a predetermined magnitude.

13. A protection circuit as recited in claim 12, wherein the control and delay circuit comprises:

a delay circuit that is capable of generating an activation signal following a predetermined delay from when the optoelectronic device generates the excessive line current signal;

a latch circuit that is capable of providing a latched output signal in response to the activation signal; and a switch circuit that is capable of placing the electronic relay circuit into the on-hook condition upon receipt of the latched output signal.

14. A protection circuit as recited in claim 13, wherein the delay circuit comprises a resistor and capacitor network that is arranged so as to provide a predetermined time constant such that the activation signal is generated at an output of the RC network within a predetermined time of the continuous generation of the excessive line current signal.

15. A protection circuit as recited in claim 14, wherein the latch circuit comprises at least one logic gate arranged so as to provide a resettable latch that is capable of asserting the latched output signal upon receipt of the generated activation signal.

16. A protection circuit as recited in claim 15, wherein the switch circuit comprises a transistor having an output that activates the electronic relay into the on-hook condition when the latched output signal is provided by the latch circuit.

17. A protection circuit as recited in claim 16, further comprising a programmable digital processor that is electrically connected to the latch circuit, whereby the digital processor is capable of programmably causing the latch circuit to reset the latched output signal after a predetermined time-out delay and thereby cause the electronic relay to provide an on-hook condition.

18. A protection circuit as recited in claim 17, further comprising at least one backup fuse, connected between the line interface circuit and the telephone line, for opening the connection between the line interface circuit and the telephone line when the line-current exceeds a second predetermined maximum magnitude.

19. A protection circuit intended for use with a line interface circuit that is electrically connectable to a telephone line, the protection circuit comprising:

relay means, connected between the interface circuit and the telephone line, for selectively placing the line circuit into either an on-hook state or into an off-hook state;

current sensing means for providing an excessive line current signal when the magnitude of a supply voltage present across the telephone line exceeds a predetermined magnitude, wherein the supply voltage presents a line-current to the interface circuit;

a delay circuit that is capable of generating an activation signal following a predetermined delay from when the current sensing means provides the excessive line current signal;

a latch circuit that is capable of providing a latched output signal in response to the activation signal; and a switch circuit that is capable of placing the relay means into the on-hook state upon receipt of the latched output signal.

20. A protection circuit as recited in claim 19, further comprising a programmable digital processor that is electrically connected to the latch circuit, whereby the digital processor is capable of programmably causing the latch circuit to reset the latched output signal after a predetermined time-out delay and thereby cause the relay means to provide an on-hook condition.

21. In a line interface circuit that is electrically connectable to a telephone line, a method for protecting the line interface circuit from excessive line currents presented by way of the telephone line, the method comprising:

connecting an electronic relay, capable of providing an open or a closed electrical connection, between the interface circuit and the telephone line;

sensing the magnitude of a supply voltage present across the telephone line, wherein the supply voltage presents a line current to the interface circuit;

generating an excessive line current signal when the magnitude of the supply voltage exceeds a predetermined magnitude;

activating the electronic relay into an open position only if the excessive line current signal is generated for a predetermined amount of time.

22. A protection circuit for use in a PCMCIA modem card having a telephone line interface circuit that is electrically connectable to a telephone line, the protection circuit comprising:

an electronic switch circuit that is selectively operable so as to be capable of providing an open or a closed electrical connection between the line interface circuit and the telephone line;

an excessive voltage sensing circuit that generates an excessive line current signal when the magnitude of a supply voltage present across the telephone line exceeds a predetermined magnitude so as to produce an excessive line-current that is presented to the interface circuit.

* * * * *